United States Patent
Monajemi et al.

(10) Patent No.: US 11,985,542 B2
(45) Date of Patent: May 14, 2024

(54) CHANNEL SELECTION FOR MULTI-LINK DEVICES WITH BANDWIDTH CONSTRAINTS

(71) Applicant: Cisco Technology, Inc., San Jose, CA (US)

(72) Inventors: Pooya Monajemi, San Jose, CA (US); Vishal S. Desai, San Jose, CA (US); Malcolm M. Smith, Richardson, TX (US); Santosh B. Kulkarni, Sunnyvale, CA (US); Young Il Choi, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 240 days.

(21) Appl. No.: 17/644,457

(22) Filed: Dec. 15, 2021

(65) Prior Publication Data

US 2023/0189064 A1 Jun. 15, 2023

(51) Int. Cl.
*H04W 28/082* (2023.01)
*H04W 28/06* (2009.01)
*H04W 72/0453* (2023.01)
*H04W 72/542* (2023.01)
*H04W 76/15* (2018.01)
*H04W 88/06* (2009.01)

(52) U.S. Cl.
CPC ......... *H04W 28/06* (2013.01); *H04W 28/082* (2023.05); *H04W 72/0453* (2013.01); *H04W 72/542* (2023.01); *H04W 76/15* (2018.02); *H04W 88/06* (2013.01)

(58) Field of Classification Search
None
See application file for complete search history.

(56) References Cited

U.S. PATENT DOCUMENTS

| | | |
|---|---|---|
| 2011/0286418 A1 | 11/2011 | Liu et al. |
| 2017/0290022 A1 | 10/2017 | Winters et al. |
| 2021/0045095 A1 | 2/2021 | Cariou et al. |
| 2021/0321473 A1* | 10/2021 | Monajemi ............ H04B 17/336 |
| 2023/0103325 A1* | 4/2023 | Li ........................ H04W 24/08 370/329 |
| 2023/0261771 A1* | 8/2023 | Garcia Rodriguez ...... H04W 24/02 370/252 |

FOREIGN PATENT DOCUMENTS

| | | |
|---|---|---|
| WO | 2021002618 A1 | 1/2021 |
| WO | 2021011476 A1 | 1/2021 |

* cited by examiner

*Primary Examiner* — The Hy Nguyen
(74) *Attorney, Agent, or Firm* — Patterson + Sheridan, LLP

(57) ABSTRACT

Techniques are provided for optimizing performance of a multi-link device (MLD). In one embodiment, a controller receives information about a filter response for a first multi-link device (MLD, determines, based on the information about the filter response, a filtering transitional region of the first MLD indicating a range of frequencies where there is energy leakage due to the first MLD device operating in a simultaneous transmission and reception (STR) mode, determines cost metrics for a plurality of channels by identifying a STR and non-STR (NSTR) ratio for each of the plurality of channels, and assigns, based on the filtering transitional region and the cost metrics, a first radio of an access point (AP) to one of the plurality of channels to enable the first MLD to operate in the STR mode when communicating with the first radio.

20 Claims, 4 Drawing Sheets

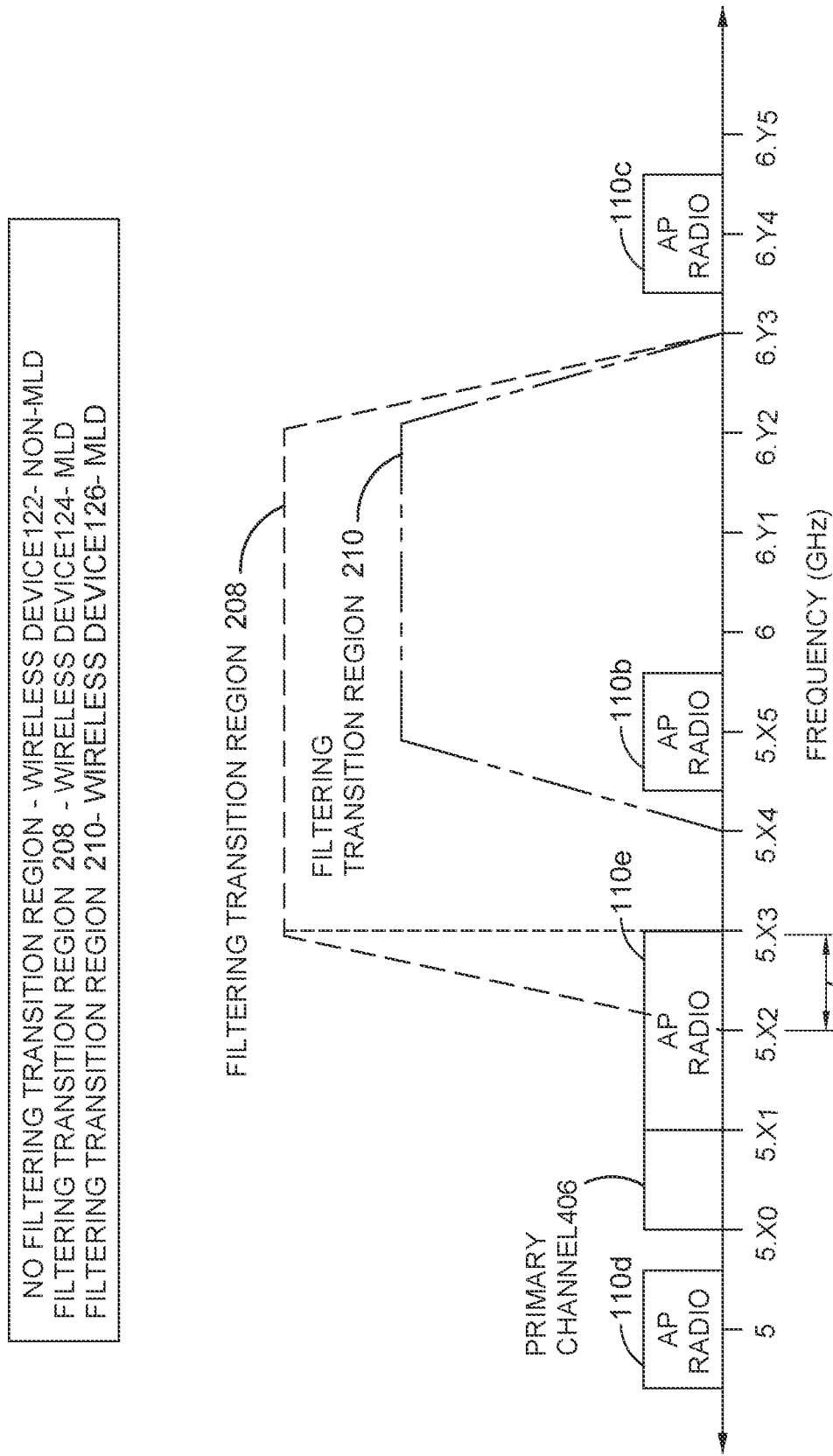

CHANNEL SELECTION FOR MULTI-LINK DEVICES WITH BANDWIDTH CONSTRAINTS

TECHNICAL FIELD

Embodiments presented in this disclosure generally relate to optimizing the performance of multi-link devices. More specifically, embodiments disclosed herein describe techniques for improving channel selection and operation of multi-link devices subject to cross-link interference and station device constraints.

BACKGROUND

Under the IEEE 802.11 ax standard, a Wi-Fi access point (AP) communicates with a station device using one of the 2.4 GHz, 5 GHz, or 6 GHz frequency bands. Each AP can either simultaneously transmit or simultaneously receive signals on different frequency bands, but cannot both simultaneously transmit and simultaneously received signals on different frequency bands. Each of these frequency bands includes a plurality of smaller frequency bands, or channels.

The AP can assign a radio to a given channel to establish a communication link between the AP and the station device on the channel. The AP and the station device can then transmit and receive signals across the channel. Some APs (or a network controller coupled to the APs) can perform dynamic channel assignment (DCA) to assign a radio to a channel experiencing a relatively low amount of interference at the time of the channel assignment.

With the advent of multi-link devices (MLDs) in 802.11 be, devices (APs and client devices) can operate concurrently in multiple bands, including adjacent bands such as 5 and 6 GHz. Further, these MLDs can be operating in a simultaneous transmission and reception (STR) mode where they can receive and transmit simultaneously using channels in two separate frequency bands. DCA can also be used to intelligently assign channels to MLDs to support STR modes of operation.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

FIG. 4 illustrates AP radio assignments and filter responses of devices, according to one embodiment.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
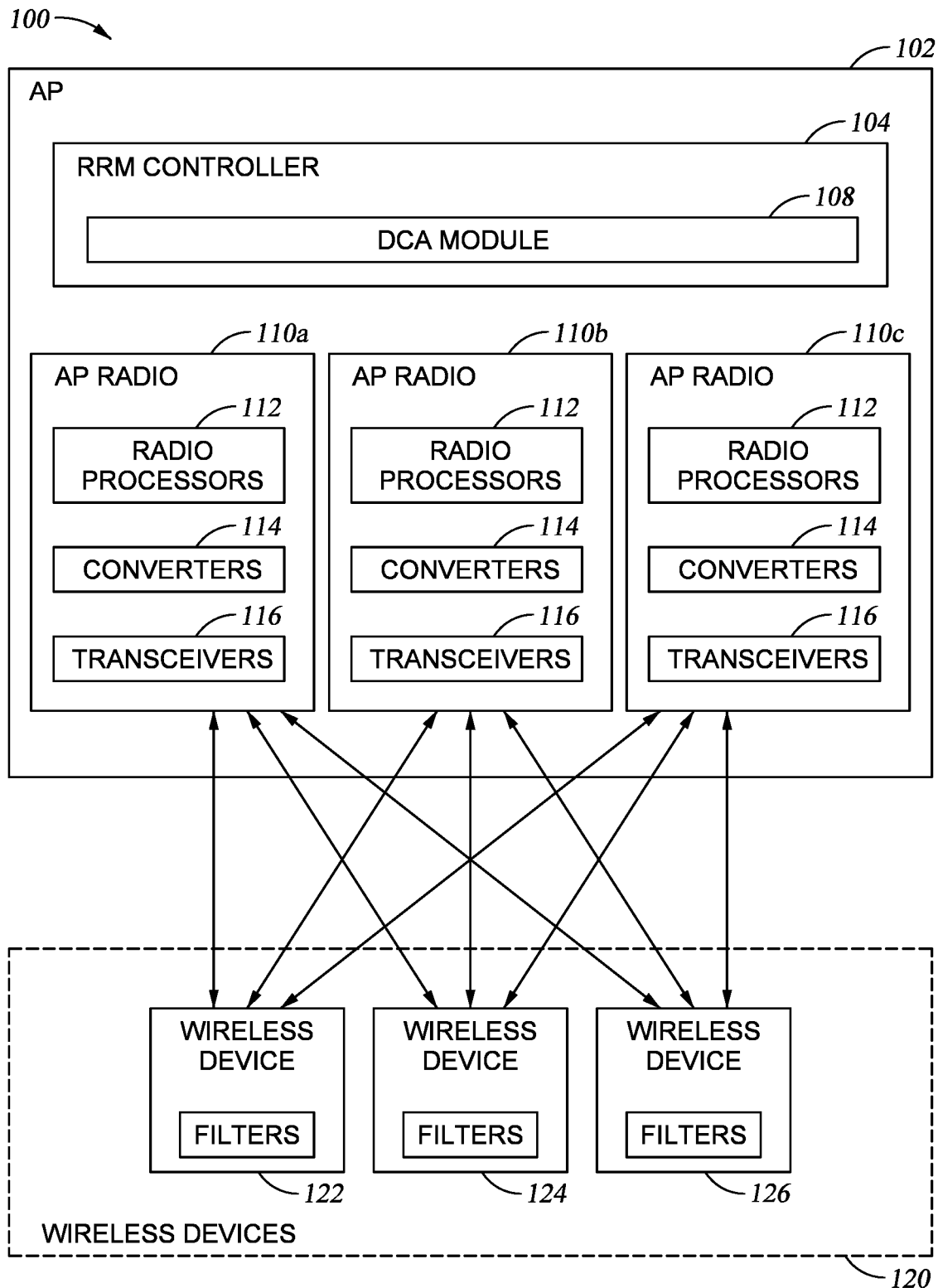
FIG. 1 illustrates a wide local area network, according to one embodiment.

One embodiment described herein is a method that includes determining, based on information received from a first MLD, a filtering transitional region of the first MLD indicating a range of frequencies where there is energy leakage due to the first MLD device operating in a STR mode, determining cost metrics for a plurality of channels by identifying a STR and non-STR (NSTR) ratio for each of the plurality of channels, and assigning, based on the filtering transitional region and the cost metrics, a first radio of an access point (AP) to one of the plurality of channels to enable the first MLD to operate in the STR mode when communicating with the first radio.

Another embodiment described herein is a method that includes determining, based on information received from a first MLD), a filtering transitional region of the first MLD indicating a range of frequencies where there is energy leakage due to the first MLD device operating in a STR mode, determining cost metrics for a plurality of channels by identifying a signal to noise (SNR) associated with operating the first MLD device in the STR mode at each of the plurality of channels, and assigning, based on the filtering transitional region and the cost metrics, a first radio of an AP to one of the plurality of channels to enable the first MLD to operate in the STR mode when communicating with the first radio.

Another embodiment described herein is a non-transitory computer readable medium having program instructions embodied therewith, the program instructions executable by a processor to perform an operation, the operation includes determining, based on information received from a first MLD, a filtering transitional region of the first MLD indicating a range of frequencies where there is energy leakage due to the first MLD device operating in a STR mode, determining cost metrics for a plurality of channels by identifying a SNR associated with operating the first MLD device in the STR mode at each of the plurality of channels, and assigning, based on the filtering transitional region and the cost metrics, a first radio of an AP to one of the plurality of channels to enable the first MLD to operate in the STR mode when communicating with the first radio.

EXAMPLE EMBODIMENTS

Embodiments of the present invention are directed towards techniques for optimizing performance of a multi-link AP. A multi-link AP is an MLD that can communicate using multiple links in multiple frequency bands (e.g., one or more links in the 5 GHz frequency band and one or more links in the 6 GHz frequency band). Further, a MLD can perform independent, simultaneous transmission and reception (STR) of signals on multiple frequency bands. The multi-link AP can assign its radios to channels with low communication costs as determined by at least one of: (1) an assessment of transmission and reception power differences of wireless devices connected to the multilink AP; (2) an assessment of the number of STR-capable multi-link devices (MLDs) on channels used by the multi-link AP; or (3) use of a predefined metric based on historical trends of connected devices, along with other considerations (e.g., noise and interference from neighboring wireless devices, or distance from other active channels). Further, the multi-link AP can assign its radios to a primary channel or a reserved channel based on the type of connected wireless devices, or based on the filter responses of the wireless devices. Moreover, the multi-link AP can use channel metric biasing to categorize operating characteristics of the devices for improved channel selection.

FIG. 1 illustrates a wide local area network (WLAN) 100, according to one embodiment. As shown, the WLAN 100 comprises a multi-link AP 102 that communicates with a plurality of wireless devices 120.

The multi-link AP 102 (e.g., a MLD) can have concurrent associations on multiple links with another MLD. An MLD that can perform an independent, simultaneous transmission and reception of signals on two links (whether those links are in different frequency bands or the same frequency band) is defined as an STR MLD on those two links. For example, the multi-link AP 102 can simultaneously transmit a first signal on a first link in the 5 GHz frequency band, while also receiving a second signal on a second link in the 6 GHz frequency band.

In this embodiment, the multi-link AP 102 includes a radio resource management (RRM) controller 104 and a plurality of AP radios 110. While in this example, the RRM controller 104 is shown in the AP 102, in other embodiments, the RRM controller 104 is disposed in a network controller (or other network management modules) coupled to the AP 102 (as well as potentially multiple APs). Not all components of the multi-link AP 102 are shown.

The AP 102 can include a one or more processors that obtain data and instructions from the AP radios 110. The processors can execute the RRM controller 104 (e.g., a software application) and can process data or execute instructions or algorithms to manage operations and assignments of the AP radios 110. Although not shown, the AP 102 can include memory that stores the RRM controller 104 such as hard-disk drives, solid state drives, flash memory devices, optical media, RAM, and the like.

The RRM controller 104 includes a DCA module 108 (e.g., a software module) can comprise a set of computer readable instructions or a code for a software application that, when processed by a processor in the AP 102 (or a network controller if the RRM controller 104 is disposed there instead), performs DCA functions described herein.

In one embodiment, the RRM controller 104 receives data from the AP radios 110 that can include the information from wireless device 122, wireless device 124, and wireless device 126, such as the number, and respective operating modes, of MLDs on channels used by the multi-link AP 102; transmission power or receiving power of the wireless devices 120; and filter responses, noise levels, client loads, interference, or the like, of the wireless devices 120. The RRM controller 104 can also receive a predefined metric based on historical trends of the wireless devices 120 from the memory 106.

The DCA module 108 can use the data received from the AP radios 110 to select channels with the lowest interference for radio assignments. Further, the RRM controller 104 can select a primary channel (and, optionally, one or more secondary channels) or a reserved channel for radio assignment based on the type of the wireless devices 120, or based on the filter responses of the wireless devices 120. Moreover, the multi-link AP 102 can use channel metric biasing to categorize operating characteristics of the wireless devices 120 for improved channel selection. These operations are described in greater detail in FIGS. 2-4.

In the illustrated embodiment, the AP radios 110 serve as a communication interface between the RRM controller 104 and the wireless devices 120. The AP radios 110 comprise one or more radio processors 112, converters 114, digital signal processors (not shown), transceivers 116, etc. The processors 112 execute instructions to process signals, control the transceivers 116, and perform other operations of the AP radios 110. The converters 114 can include a plurality of modulators/demodulators, AD/DA converters, encoders/decoders, or the like, to convert, process, or relay signals between the RRM controller 104 and the wireless devices 120. The transceivers 116 can include transmitters, receivers, and amplifiers, to transmit or receive signals to the wireless devices 120 via antennas (not shown).

Moreover, the AP radios 110 may be assigned to different frequency bands. For example, the AP radio 110a may be assigned to the 2.4 GHz band, radio 110b to the 5 GHz band, and radio 110c to the 6 GHz band. Alternatively, multiple radios 110 may be assigned to the same frequency band. For example, the AP radios 110a and 110b may both be assigned to the 5 GHz frequency band (but use different channels in that band) while the AP radio 110c is assigned to the 6 GHz band.

In one embodiment, the multi-link AP 102 establishes simultaneous communication links with the wireless devices 120 via channels on different frequency bands. For instance, the multi-link AP 102 and wireless device 122 can communicate on a channel of the 5 GHz frequency band via a first communication link and the multi-link AP 102 can communicate with wireless device 124 and wireless device 126 on channels of the 2.4 GHz, 5 GHz, or 6 GHz frequency bands via a set of second communication links.

The wireless devices 120 can be any electronic system capable of communicating on an 802.11 protocol (e.g., Wi-Fi devices). For instance, a device can be a personal computer or computing device, a smartphone, an AP, a router, or the like. The wireless devices 120 are discussed in greater detail in FIG. 2.

Figure 2:
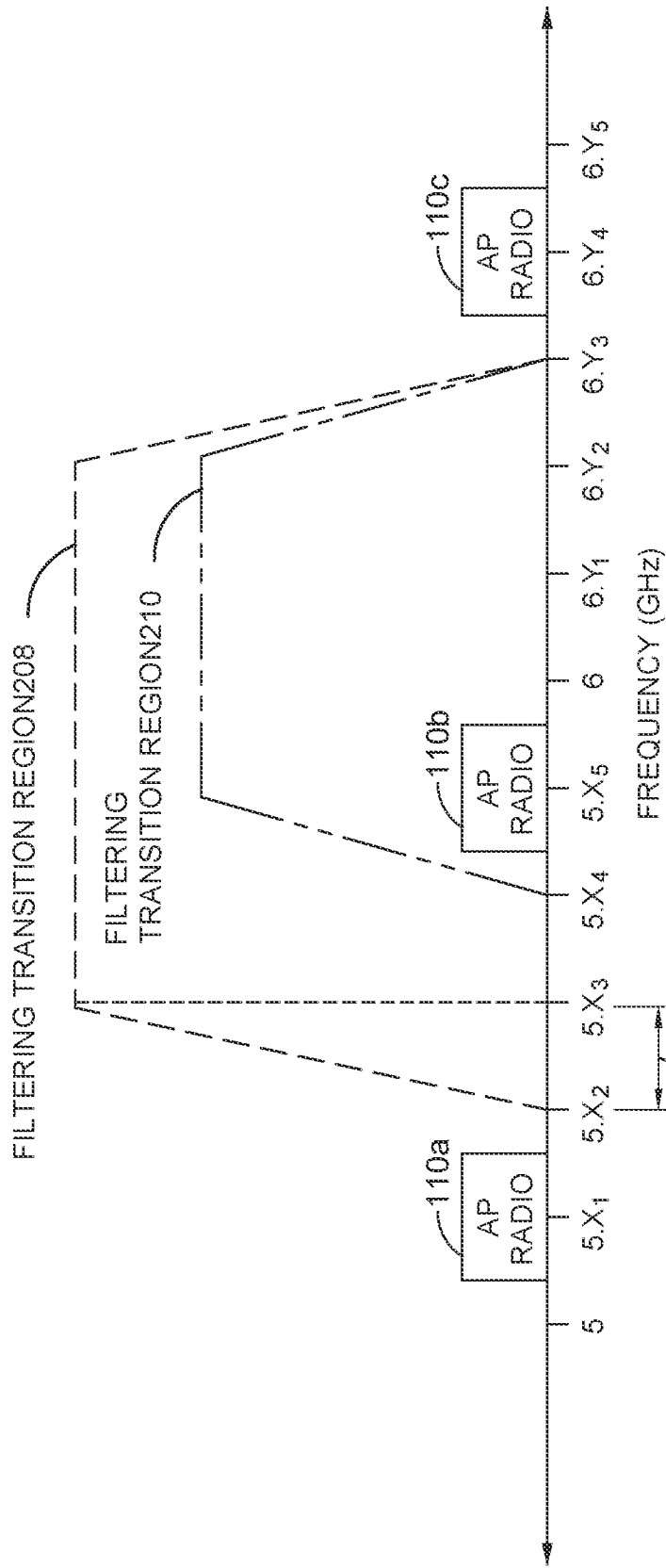
FIG. 2 illustrates AP radio assignments and filter transition regions of devices, according to one embodiment.
Figure 3:
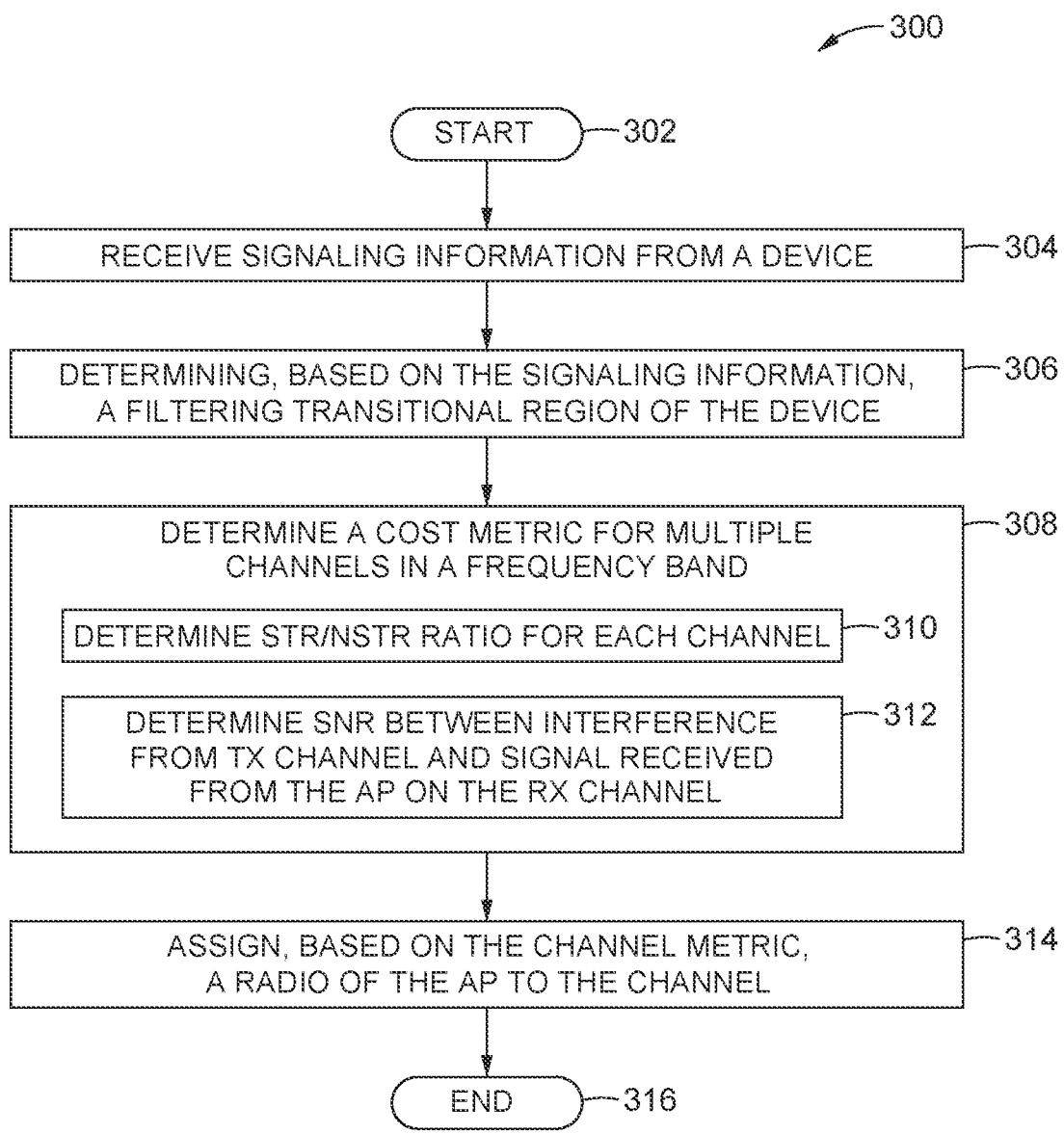
FIG. 3 depicts a flowchart of a method for implementing a dynamic channel assignment algorithm, according to one embodiment.

FIG. 2 illustrates multi-link AP radio assignments and filter transition regions of wireless devices, according to one embodiment. FIG. 3 depicts a flowchart of a method for implementing a DCA module, according to one embodiment. For ease of explanation, FIG. 2 is described in conjunction with FIG. 3.

The method 300 begins at block 302. At block 304, the multi-link AP receives signaling information from a wireless device. Each wireless device in communication with the multi-link AP can be an MLD or non-MLD. An MLD can operate in STR mode or non-STR mode. In STR mode, the wireless device can perform STR communications with the multi-link AP, which comprises simultaneously transmitting and receiving signals on multiple links. In non-STR mode, the device cannot simultaneously receive signals from the multi-link AP on one link, and transmit signals on another link, but can nonetheless communicate with the AP using multiple links, just not send and receive on separate links at the same time. A non-MLD can associate and communicate with the multi-link AP on only one link.

In one embodiment, each MLD includes filters that attenuate signals according to its filter response range, in order to reduce interference between signals communicated on adjacent frequency bands during STR communications. That is, the MLD can include one or more filters for ensuring signals transmitted using links in the 5 GHz band do not interfere with signals received on links in the 6 GHz band, and vice versa. The filters of different devices can vary depending on cost considerations, design considerations, manufacturing constrains, or the like. For instance, two devices can incorporate static or dynamic filters tuned to the border frequency between two frequency bands, where each device uses different filter transition widths. The filter response can represent a frequency response range of single filter or mask, or a combination of filters or masks.

In one embodiment, the signaling information received by the multi-link AP from the wireless device includes information about a filter or mask of the device. This signaling information can include data corresponding to at least one of: a transition band, a degree of signal attenuation, a filter type identifier, or a minimum frequency separation of the filter.

At block 306, the RRM controller determines, based on the signaling information, a filtering transition region of the wireless device. In one embodiment, the multi-link AP can also use the signaling information received from the wireless device to determine whether the wireless device is an MLD operating in STR mode, an MLD operating in non-STR mode, or a non-MLD.

As shown in FIG. 2, filtering transition regions of wireless devices are transposed on the adjacent 5 GHz and 6 GHz frequency bands. In the illustrated embodiment, wireless device 122 is a non-MLD. Because non-MLDs cannot perform STR operations, non-MLDs do not have internal filters to separate signals simultaneous transmitted or received on different frequency bands. Accordingly, no filtering transition region is displayed for wireless device 122 in FIG. 2.

Wireless device 124 and wireless device 126 are MLDs. A filtering transition region 208 of wireless device 124 falls between a frequency range of $5.x_2$ GHz and $6.y_3$ GHz. A filtering transition region 210 of wireless device 126 falls between a frequency range of $5.x_4$ GHz and $6.y_3$ GHz. The filtering transitional regions 208 and 210 indicate a range of frequencies where there is energy leakage due to simultaneous transmission and reception (STR) at the wireless devices 124 and 126, respectively. That is, the filtering transition regions 208, 210 illustrate overlapping transitional regions between a filter response of a first frequency band (e.g., 5 GHz band) with the filter response of a second, neighboring frequency band (e.g., the 6 GHz band) of the same wireless device. At the frequencies defined by the regions 208, 210, the filters in the wireless device are insufficient to attenuate the interference caused by performing STR where one radio on the wireless device is transmitting at the same time while radio in the device is receiving.

As mentioned above, MLDs include filters for ensuring signals transmitted in the 5 GHz band do not interfere with signals being simultaneously received in the 6 GHz band, and vice versa. However, these filters are not perfect, and signals transmitted in one band can create noise or interference in the other band. FIG. 2 illustrates such a situation. There, the filtering transition region 208 for the device 124 illustrates that when the device 124 transmits in the 6 GHz band, its filters can substantially prevent these signals from interfering with receiving signals using channels that are between 5 and $5.x_2$. However, the region 208 illustrates there will be interference caused by transmitting in the 6 GHz band when receiving signals using channels between $5.x_2$ and $5.x_5$.

Similarly, the filtering transition region 208 illustrates that when the device 124 transmits in the 5 GHz band, its filters can substantially prevent these signals from interfering with receiving signals using channels that are between $6.y_3$ and $6.y_5$. However, the region 208 also illustrates there will be interference caused by transmitting in the 5 GHz band when receiving signals using channels between 6 and $6.y_3$.

The wireless device 126 has a different shaped filtering transition region 210 from the wireless device 124, which can be due to better filters, more filters, etc. The filtering transition region 210 for the device 126 illustrates that when the device 126 transmits in the 6 GHz band, its filters can substantially prevent these signals from interfering with receiving signals using channels that are between 5 and $5.x_4$. However, the region 210 also illustrates there will be interference caused by transmitting in the 6 GHz band when receiving signals using channels between $5.x_4$ and $5.x_5$.

Similarly, the filtering transition region 210 illustrates that when the device 126 transmits in the 5 GHz band, its filters can substantially prevent these signals from interfering with receiving signals using channels that are between $6.y_3$ and $6.y_5$. However, the region 208 also illustrates there will be interference caused by transmitting in the 5 GHz band when receiving signals using channels between 6 and $6.y_3$. In one embodiment, the multi-link AP can use the signaling information to determine whether wireless device 124 or wireless device 126 is operating on a radio at a frequency within its respective filtering transition region. An MLD that operates on a radio at a frequency within its respective filtering transition region does not operate in STR mode due to the interference caused by transmitting simultaneously in another link in the neighboring frequency band—i.e., there is insufficient filtering at that frequency. Hence, the multi-link AP can determine that such an MLD is operating in non-STR mode. For instance, because AP radio 110b is within the frequency range of the filtering transition region 210 of the wireless device 126, wireless device 126 cannot operate in STR mode while using a pair of AP radios that includes AP radio 110b. Hence, the multi-link device can determine that wireless device 126 is operating in non-STR mode when using AP radio 110b.

However, the RRM controller can determine that an MLD operating on a pair of radios at frequencies outside its respective filter response range can operate in STR mode, since its signal transmission and reception is not inhibited by its own filter response. Continuing the above example, if wireless device 126 assigned to operate on a pair of radios that does not include AP radio 110b (e.g., AP radio 110a and AP radio 110c), then the RRM controller determines that the wireless device 126 can operate in STR mode since neither radio of the pair is within the filtering transition region 210. In this manner, by determining the filtering transition regions for the wireless devices, the RRM controller (or the DCA module) can determine whether the MLD is operating in the STR mode or a non-STR (NSTR) mode.

As described below, the method 300 can use the signaling information of the wireless devices, which includes filter information, to assign radios of the multi-link AP (e.g., AP radio 110a, AP radio 110b, and AP radio 110c) to channels of frequency bands that are best suited for communications between the multi-link AP and the wireless devices.

At block 308, the RRM controller determines a cost metric for multiple channels in a frequency band. In one embodiment, the channel metric is a value or indicator that represents the potential for unrestricted communication on a channel relative to changes to communications on the channel due to the filters of the wireless devices (e.g., wireless devices 122, 124, and 126 in FIG. 2), congestion via neighboring devices, noise, signal interference, or the like.

In one embodiment, the cost metric of a given channel indicates a communication cost for using the channel. For example, the filters of the wireless devices can cause interference and other unwanted changes to signals communicated between the wireless devices and radios assigned to channels within the bandwidths of the filters. These channels correspond to channel metrics that indicate high communication costs.

While multiple historical factors can be considered to derive a cost metric for a channel (e.g., noise and interference from neighboring wireless devices, or distance from other active channels), the method 300 includes two sub-blocks (blocks 310 and 312) of information that can be used to determine a cost metric. These blocks can be used together, or separately (and with historical factors) to determine a cost metric for a channel.

At block 310, the RRM controller determines STR/NSTR ratio for each channel. The STR/NSTR ratio indicates the number of MLDs that can use this channel in the STR mode versus the NSTR mode. A high STR/NSTR ratio indicates that the channel is good for enabling STR communication (which is generally desirable) while a low STR/NSTR ration indicates that the channel is not good for enabling STR communication. Thus, if the AP radio uses a channel for a high STR/NSTR ratio, it is likely more MLDs will be able to use STR than a channel with a low STR/NSTR ratio. This ratio can be identified using the filtering transition regions illustrated in FIG. 2.

For instance, filtering transition region 208 indicates that STR is likely not possible for the wireless device 124 within a first frequency range between $5.x_2$ GHz and $6.y_3$ GHz due to insufficient filtering. Hence, a cost metric of a channel at a frequency outside of the first frequency range (e.g. $5.x_1$ GHz) can indicate a relatively low communication cost, since there the wireless device 124 does have sufficient filtering to prevent signals transmitted on a first channel (or link) in the 5 GHz band from interfering with a second channel (or link) that is receiving in the 6 GHz band. In comparison, a cost metric of a channel at a frequency in the first frequency range (e.g. $5.x_4$ GHz) can indicate a relatively high communication cost, since there will be a significant amount of interference caused by the transmitting link when in STR mode. Thus, the RRM controller can identify which channels the wireless device 124 can use for STR, and which it cannot.

Continuing the example, filtering transition region 210 indicates that STR is likely not possible for the wireless device 126 within a second frequency range between GHz and $6.y_3$ GHz. The first frequency range overlaps the entirety of the second frequency range. Hence, because signals communicated on a channel at a frequency in the second frequency range of the filtering transition region 210 (e.g. $5.x_5$ GHz) are less likely to support STR (since multiple wireless devices have filtering transition regions covering the second frequency range) a channel metric for a channel in the second frequency range can have a cost that is even greater than a cost metric of a channel at a frequency in the first frequency range but outside of the second frequency range. Thus, the RRM controller can identify which channels the wireless device 126 can use for STR, and which it cannot.

After determining the channels the wireless devices 124 and 126 can use for STR and which they cannot, the RRM controller can identify the STR/NSTR ratio for each channel. Channels $5-5.x_3$ and the channels $6.y_3-6.y_5$ have the highest STR/NSTR ratio since both wireless devices 124 and 126 can use STR on those channels. Channels $5.x_2-5.x_4$ will have lower STR/NSTR ratios since the wireless device 126 can use STR on those channels but wireless device 124 cannot. Channels $5.x_4-6.y_3$ will have the lowest STR/NSTR ratios since neither wireless device 124 nor wireless device 126 can use STR on those channels. In this manner, the RRM controller can adjust the cost metric for each channel in FIG. 2 based on identifying the STR/NSTR ratios.

At block 312, the RRM controller determines signal to noise ratios (SNR) between interference from TX channel and signal received from the AP on the RX channel. That is, the RRM controller can set a transmit channel (e.g., $5.x_1$) and then evaluate how much noise this channel generates in each channel in the 6 GHz band. This information can be learned using the signaling information received at block 304. The interference can also be based on other metrics such as the transmit power and the distance between the transmit antenna and the receive antenna on the MLD. Moreover, the RRM controller can determine (or estimate) the amount of signal received for each channel at the MLD based on knowing the distance from the AP and the MLD. The closer the AP to the MLD, the greater the signal strength on the receive channel.

Once the level of interference and the receive signal strength is known, the RRM controller can determine the SNR for that channel resulting from interference caused by operating in the STR mode. A channel with a higher SNR when operating in the STR mode is assigned a lower cost metric than a channel with a lower SNR when operating in the STR mode.

In addition to using one or both of the metrics described in blocks 310 and 312 to determine the cost metric, the RRM controller 104 can also use historical device trends, as one of a plurality of considerations in determining the cost metric. For instance, the cost metric can be based on the number of MLDs operating in STR mode or non-STR mode on a given channel since the last reset or power on of the multi-link AP 102.

In one embodiment, the cost metric can be set based on the likelihood that a wireless device is able to communicate at higher modulation and coding schemes (MCS) rates if steered to a channel on another communication link, or frequency band. Hence, the RRM controller can determine the cost metric based on the type of modulation, coding rate, noise increases associated with switching to another channel, or the like.

The multi-link AP may mischaracterize an operating mode, or inaccurately determine supported MCS rates, of a wireless device when the wireless device communicates with the multi-link AP at a frequency covered by a transition range of a filter response. In such cases, the multi-link AP can determine the operating mode of the wireless devices using the signaling information or cost metrics.

In one embodiment, the RRM controller of the multi-link AP applies an STR bias or non-STR bias to the cost metric based on a tapering range of a filter of the wireless device. For example, for a channel outside of the filtering transition region of a wireless device, which includes a tapering range of the filtering transition region, the RRM controller can apply an STR bias to the channel metric for the channel, which can be used to determine radio assignments for STR communications. For a channel within the filtering transition region of the wireless device, but outside of a tapering range of the filtering transition region, the RRM controller can apply a non-STR bias to the channel metric for the channel, which can be used to determine radio assignments for the operation of non-MLDs and MLDs operating in non-STR mode. In this manner, the channel metrics can accurately represent frequencies to which AP radios can be assigned for optimal STR communications with MLDs, and for minimal interference from non-STR communications (i.e., communications from non-MLDs or MLDs operating in non-STR mode).

In one embodiment, an MLD may have a filtering transitional region that prevents operation in STR mode on channels with STR-biased channel metrics. For instance, the filtering transitional region may cover a range from 5 GHz-6.$y_3$ GHz. Therefore, the MLD cannot operate in STR mode using AP radio 110a, which operates on an STR-biased channel centered at 5.$x_1$ GHz. In such cases, the multi-link AP can steer the MLD to AP radio 110b, which operates on a channel with a non-STR biased channel metric (e.g., the channel centered at 5.$x_5$ GHz) for operation in non-STR mode.

In one embodiment, for a channel within a tapering range of a filtering transitional region, the RRM controller can apply a bias to a channel metric using an expected receiving MCS capability or a traffic priority of a device operating on the channel. For instance, if a channel falls between the 5.$x_2$ GHz and 5.$x_3$ GHz (a tapering range of filtering transitional region 208) the RRM controller can apply a bias to a channel metric of this channel to steer a device from operating on this channel to operating on channel 5.$x_1$ for better higher throughput.

At block 314, the multi-link AP assigns, based on the filtering transitional regions and the cost metrics, a radio of the multi-link AP to a channel. In one embodiment, the RRM controller uses the DCA module to assign the AP radios to channels to optimize communications between the multi-link AP and the wireless devices.

The RRM controller can use filtering transitional regions to assign the AP radios to channels by ensuring that AP radios designated for STR operation are outside the filtering transitional regions for each of the wireless devices associated with the AP. That is, referring to FIG. 2, the RRM controller (or DCA module) can identify that channels 5-5.$x_1$ and 6.$y_4$-6.$y_5$ are suitable channels for enabling STR communication since these channels are outside of the filtering transitional regions for both wireless device 124 and 126. In this manner, the RRM controller can use the filtering transitional regions to identify the channels that enable all the associated MLDs to operate in the STR mode.

The RRM controller can also use the cost metric to assign the AP radios 110 to channels with cost metrics that indicate the lowest communication cost. As mentioned above, the filtering transitional regions can also be used to determine the cost metrics (such as when identifying the STR/NSTR ratio for each channel). For example, the RRM controller can assign the AP radios 110 to channels outside of any filtering transitional regions of the wireless devices, which have low cost metrics. In this manner, the multi-link AP ensures that communications of the wireless devices are not subject to unwanted effects of the filter responses. However, channels that outside the filtering transitional regions may have higher cost metrics because of other reasons such as noise and interference from neighboring wireless devices, or distance from other active channels which make them unsuitable. Thus, the RRM controller may determine not to use the channels. Instead, the RRM controller may select a channel that is within the filtering transitional region for one of the MLDs (e.g., a channel between 5.$x_2$-5.$x_4$ which is within the filtering transitional region 208 but is not within the filtering transitional region 210) because the overall cost metric for that channel is lower than channels that are outside all of the filtering transitional regions. This may mean one of the MLDs cannot operate in the STR mode when assigned a link on that channel.

Thus, the RRM controller can consider multiple factors when assigning channels to the AP radios such as identifying the channels that are external to the filtering transitional regions, the STR/NSTR ratios (block 310), and the SNR due to STR interference (block 312), as well as other traditional metrics. In this manner, the RRM controller can optimize channel assignment in the presence of MLD devices.

In another embodiment, the RRM controller assigns radios to channels in order to establish a reserved non-MLD channel. The RRM controller can use the filtering transitional ranges and the cost metrics described above to identify the reserved non-MLD channel. For example, if a channel has a high cost metric due to being within the filtering transitional regions, having a low STR/NSTR ratio, and/or a low SNR due to STR interference, the RRM controller can select that channel as the reserved non-MLD channel. Put differently, the same metrics that are evaluated to determine a channel that would be good for STR can also be used to identify a channel that would be bad for STR, and thus, is a good candidate for being a reserved non-MLD channel. For example, the RRM controller can establishes the reserved non-MLD channel by assigning a radio to a channel that is within the filtering transitional regions of MLDs operating in STR mode.

As shown in FIG. 2, the RRM controller assigns AP radio 110a to a channel centered at 5.$x_1$ GHz, and AP radio 110c to a channel centered at 6.$y_4$ GHz. These channels are outside of the filter response 208 and filter response 210. Hence, these channels will likely have cost metrics that indicate lower communication costs than channels located within filter response 208 and filter response 210. In this manner, signals communicated between the multi-link AP and wireless devices on these channels can operating in the STR mode. For instance, STR communications of wireless device 124 and wireless device 126 can be transmitted on the channels without significant STR interference.

Returning to FIG. 3, in one embodiment, the RRM controller implements the DCA module to assign the AP radios 110 to given channels using a predefined channel metric based on historical device trends, along with other considerations (e.g., noise and interference from neighboring wireless devices, or distance from other active channels). In another embodiment, the RRM controller implements the DCA module to assign the AP radios 110 to given channels using the channel metric that indicates a comparison of the receiving power relative to the transmission power experienced by a device on the given channels. In yet another embodiment, the RRM controller can implement the DCA module to assign the AP radios 110 to given channels using the cost metric that indicates the likelihood that a device is able to communicate at higher MCS rates if steered to a channel on another communication link.

The method ends at block 316. One benefit to the channel selection techniques of the present disclosure is that communication between an AP and a number of devices can be optimized by assigning radios of the AP to the channels best suited for low signal interference given the varying filters of the devices.

FIG. 4 illustrates AP radio assignments and filter responses of devices, according to one embodiment. In one embodiment, the RRM controller can assign a radio to a channel that overlaps a tapering range of a filtering transitional region of a MLD.

In such a case, the RRM controller can determine whether the wireless device is aware of a radio assignment operating scheme of the multi-link AP. In one embodiment, the radio assignment operating scheme comprises a design or plan of how the multi-link AP handles radio assignments. For example, the radio assignment operating scheme can detail how the multi-link AP assigns radios to channels operating at a frequency within the tapering range.

When a wireless device is unaware of a radio assignment operating scheme of the multi-link AP, the wireless device may attempt to transmit and receive signals on a channel at a frequency that is within by the tapering range. For instance, a wireless device that communicates with the multi-link AP on AP radio 110e may transmit at a frequency between $5.x_2$ GHz and $5.x_3$ GHz. Communications at frequencies within the tapering region are not ideal, since there may be a significant amount of STR interference.

In one embodiment, the multi-link AP sends a signal indicating the operating scheme to the wireless device to instruct the wireless device to operate on a primary channel 406 (and, optionally, one or more secondary channels) that is outside of the filtering transitional region (assuming a hard-cut filter transition region). In response, the wireless device can restrict the bandwidth of its communications to a frequency range outside of the filtering transitional region. In the same manner, other wireless devices that communicate with the multi-link AP can use the radio assignment operating scheme to ensure that they transmit and receive signals on the primary channel, thereby avoiding STR interference. In one embodiment, the RRM controller of the multi-link AP determines a channel metric based on the multi-link device operating in this reduced bandwidth mode.

In the illustrated embodiment, AP radio 110e is assigned to channels spanning $5.x_0$ GHz-$5.x_3$ GHz. Because the filtering transitional region 208 includes the frequencies between $5.x_2$ GHz and $5.x_3$ GHz, a wireless device serviced by AP radio 110e can, with knowledge of the operating scheme of the multi-link AP, reduce its communication bandwidth to the primary channel (and any secondary channels) between $5.x_0$ and $5.x_1$, which is outside of the filtering transitional region 208. In one embodiment, the wireless device can then expand to use more secondary channel(s) that may be within the filtering transitional region 208 (e.g., between $5.x_2$ GHz and $5.x_3$ GHz). Because these secondary channels are within the tapering region of the filtering transitional region 208, the wireless device may not be successful at communicating on those channels, but this depends on the environmental conditions and so successful communication is still possible.

To allow STR communications to occur unobstructed by the filter responses of the wireless devices, the RRM controller assigns AP radio 110d and AP radio 110c to respective channels centered at 5 GHz and $6.y_4$ GHz, which are outside of any filter response range of the wireless devices. Hence MLDs can perform STR communications on these channels. For instance, wireless device 124 and wireless device 126 can both operate in STR mode when communicating with AP radio 110d and AP radio 110c to simultaneously transmit and receive signals on these channels unencumbered by STR interference. However, non-MLDs and MLDs operating in non-STR mode can also perform non-STR communications using either one of these channels.

In order to prevent non-STR communications from interfering with the STR communications, the RRM controller assigns AP radio 110b to a channel centered at $5.x_5$ GHz, which is within the ranges of filtering transitional regions 208 210. In this example, the AP radio 110b is assigned a reserved non-MLD channel which can be used by non-MLD devices. Moreover, if bandwidth becomes limited on AP radios 110d and 110c, a MDL device can switch to operating in the NSTR mode and use AP radio 110b, which may have plenty of available bandwidth. This can improve performance even though the MLD device now operates in the NSTR mode.

For the aforementioned reasons, MLDs operating in STR mode cannot make use of the reserved non-MLD channel. In this manner, the reserved non-MLD channel can allow the multi-link AP to load balance and improve STR communications on channels with MLDs operating in STR mode by steering non-MLDs to the reserved non-MLD channel.

In one embodiment, the RRM controller can further categorize the wireless devices into a multiple sets of wireless devices based on their operating mode. In one embodiment a first set of wireless devices can comprise MLDs operating in STR mode. A second set of wireless devices can comprise non-MLDs and MLDs operating in non-STR mode. Upon determining that a ratio of the first set of wireless devices to the second set of wireless devices operating on a channel exceeds a predefined threshold, the RRM controller can steer one or more wireless devices of the first set to the reserved non-MLD channel. In this manner, MLDs operating in STR mode can operate without interference or congestion on a channel due to non-MLDs and MLDs operating in non-STR mode.

By way of example using the illustrated embodiment, assume that AP radio 110d services four MLDs operating in STR mode and four non-MLDs. If the predefined ratio of the first set of wireless devices to the second set of wireless devices is 2:1, the RRM controller can determine that this ratio (1:1) of wireless devices on the channel serviced by AP radio 110d exceeds the predefined threshold. Thus, the RRM controller can steer the non-MLDs to the reserved non-MLD channel until the predefined ratio is met. Further, if the available bandwidth for a channel used for STR communication falls below a threshold, and all the non-MLDs have already been steered away from the channel, the RRM controller can steer some of the MLD devices using that channel to the reserved non-MLD channel, but this will force those MLDs to switch to operating in the NSTR mode.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
   determining, based on information received from a first multi-link device (MLD), a filtering transitional region of the first MLD indicating a range of frequencies where there is energy leakage due to the first MLD device operating in a simultaneous transmission and reception (STR) mode;
   determining cost metrics for a plurality of channels by identifying a STR and non-STR (NSTR) ratio for each of the plurality of channels; and
   assigning, based on the filtering transitional region and the cost metrics, a first radio of an access point (AP) to one of the plurality of channels to enable the first MLD to operate in the STR mode when communicating with the first radio.

2. The method of claim 1, wherein, when operating in the STR mode, the first MLD simultaneously transmits data to the AP and receives data from the AP using a 5 GHz frequency band and a 6 GHz frequency band.

3. The method of claim 2, wherein the first radio is assigned a channel in the 5 GHz frequency band and a second radio of the AP is assigned a channel in the 6 GHz frequency band, wherein, when operating in the STR mode, the first MLD simultaneously transmits data to the first radio and receives data from the second radio.

4. The method of claim 2, wherein the filtering transitional region is based on overlapping transitional regions between a first filter response of the first MLD corresponding to the 5 GHz frequency band and a second filter response of the first MLD corresponding to the 6 GHz frequency band.

5. The method of claim 1, further comprising:
   determining, based on the filtering transitional region and the cost metrics, a reserved channel for MLDs operating in a NSTR mode and non-MLDs; and
   assigning a second radio of the AP to the reserved channel.

6. The method of claim 5, further comprising:
   determining, based on a plurality of wireless devices associated with the AP, a ratio of a first set of the plurality of wireless devices comprising MLDs that operate in the STR mode and a second set of the plurality of wireless devices comprising MLDs that operate in the NSTR mode and non-MLDs; and
   upon determining that the ratio exceeds a predefined threshold, steering at least one device of the second set to the reserved channel.

7. The method of claim 1, further comprising:
upon determining that the first radio is assigned to a frequency band that includes a portion the filtering transitional region, assigning the first MLD to a primary channel of the first radio that does not overlap with the filtering transitional region; and
selecting a number of secondary channels for the first MLD that defines a bandwidth of the first MLD and avoids the filtering transitional region.

8. The method of claim 1, further comprising:
determining, based on signaling information received at the AP from a second MLD, a frequency of a channel relative to a tapering region of a second filtering transition region of the second MLD,
wherein determining the cost metrics is also based on at least one of: the frequency, a modulation or coding scheme (MCS) supported by operating in the tapering region, or a traffic priority of the second MLD.

9. A method, comprising:
determining, based on information received from a first multi-link device (MLD), a filtering transitional region of the first MLD indicating a range of frequencies where there is energy leakage due to the first MLD device operating in a simultaneous transmission and reception (STR) mode;
determining cost metrics for a plurality of channels by identifying a signal to noise ratio (SNR) associated with operating the first MLD device in the STR mode at each of the plurality of channels; and
assigning, based on the filtering transitional region and the cost metrics, a first radio of an access point (AP) to one of the plurality of channels to enable the first MLD to operate in the STR mode when communicating with the first radio.

10. The method of claim 9, wherein, when operating in the STR mode, the first MLD simultaneously transmits data to the AP and receives data from the AP using a 5 GHz frequency band and a 6 GHz frequency band.

11. The method of claim 10, wherein the first radio is assigned a channel in the 5 GHz frequency band and a second radio of the AP is assigned a channel in the 6 GHz frequency band, wherein, when operating in the STR mode, the first MLD simultaneously transmits data to the first radio and receives data from the second radio.

12. The method of claim 10, wherein the filtering transitional region is based on overlapping transitional regions between a first filter response of the first MLD corresponding to the 5 GHz frequency band and a second filter response of the first MLD corresponding to the 6 GHz frequency band.

13. The method of claim 9, further comprising:
determining, based on the filtering transitional region and the cost metrics, a reserved channel for MLDs operating in a non-STR (NSTR) mode and non-MLDs; and
assigning a second radio of the AP to the reserved channel.

14. The method of claim 13, further comprising:
determining, based on a plurality of wireless devices associated with the AP, a ratio of a first set of the plurality of wireless devices comprising MLDs that operate in the STR mode and a second set of the plurality of wireless devices comprising MLDs that operate in the NSTR mode and non-MLDs; and
upon determining that the ratio exceeds a predefined threshold, steering at least one device of the second set to the reserved channel.

15. The method of claim 9, further comprising:
upon determining that the first radio is assigned to a frequency band that includes a portion of the filtering transitional region, assigning the first MLD to a primary channel of the first radio that does not overlap with the filtering transitional region; and
selecting a number of secondary channels for the first MLD that defines a bandwidth of the first MLD and avoids the filtering transitional region.

16. The method of claim 9, further comprising:
determining, based on signaling information received at the AP from a second MLD, a frequency of a channel relative to a tapering region of a second filtering transition region of the second MLD,
wherein determining the cost metrics is also based on at least one of: the frequency, a modulation or coding scheme (MCS) supported by operating in the tapering region, or a traffic priority of the second MLD.

17. A non-transitory computer readable medium having program instructions embodied therewith, the program instructions executable by a processor to perform an operation, the operation comprising:
determining, based on information received from a first multi-link device (MLD), a filtering transitional region of the first MLD indicating a range of frequencies where there is energy leakage due to the first MLD device operating in a simultaneous transmission and reception (STR) mode;
determining cost metrics for a plurality of channels by identifying a signal to noise (SNR) associated with operating the first MLD device in the STR mode at each of the plurality of channels; and
assigning, based on the filtering transitional region and the cost metrics, a first radio of an access point (AP) to one of the plurality of channels to enable the first MLD to operate in the STR mode when communicating with the first radio.

18. The non-transitory computer readable medium of claim 17, wherein, when operating in the STR mode, the first MLD simultaneously transmits data to the AP and receives data from the AP using a 5 GHz frequency band and a 6 GHz frequency band.

19. The non-transitory computer readable medium of claim 18, wherein the first radio is assigned a channel in the 5 GHz frequency band and a second radio of the AP is assigned a channel in the 6 GHz frequency band, wherein, when operating in the STR mode, the first MLD simultaneously transmits data to the first radio and receives data from the second radio.

20. The non-transitory computer readable medium of claim 18, wherein the filtering transitional region is based on overlapping transitional regions between a first filter response of the first MLD corresponding to the 5 GHz frequency band and a second filter response of the first MLD corresponding to the 6 GHz frequency band.

* * * * *

UNITED STATES PATENT AND TRADEMARK OFFICE
CERTIFICATE OF CORRECTION

PATENT NO. : 11,985,542 B2
APPLICATION NO. : 17/644457
DATED : May 14, 2024
INVENTOR(S) : Pooya Monajemi et al.

It is certified that error appears in the above-identified patent and that said Letters Patent is hereby corrected as shown below:

On the Title Page

In item (57), in Column 2, in "Abstract", Line 4, delete "(MLD," and insert -- (MLD), --.

In the Specification

In Column 1, Line 17, delete "802.11 ax" and insert -- 802.11ax --.

In Column 1, Lines 33-34, delete "802.11 be," and insert -- 802.11be, --.

In Column 7, Line 43, delete "GHz" and insert -- $5.x_4$ GHz --.

In Column 11, Line 63, delete "208 210." and insert -- 208, 210. --.

In the Claims

In Column 15, Line 3, in Claim 7, after "portion" insert -- of --.

Signed and Sealed this
Third Day of September, 2024

*Katherine Kelly Vidal*

Katherine Kelly Vidal
*Director of the United States Patent and Trademark Office*